United States Patent
Su et al.

(10) Patent No.: US 8,369,437 B2
(45) Date of Patent: Feb. 5, 2013

(54) MULTIPLE INPUT MULTIPLE OUTPUT ANTENNA SYSTEM, SIGNAL TRANSMISSION METHOD, SIGNAL TRANSMISSION APPARATUS, AND COMPUTER PROGRAM PRODUCT FOR THE MULTIPLE INPUT MULTIPLE OUTPUT ANTENNA SYSTEM

(75) Inventors: Hsuan-Jung Su, Sindian (TW);
Wei-Shun Liao, Pinglin Town (TW);
Chia-Yi Huang, Taichung (TW);
Chun-Chi Chen, Nantou (TW);
Kun-Hung Lee, Taipei (TW)

(73) Assignee: Institute for Information Industry, Taipei (TW)

( * ) Notice: Subject to any disclaimer, the term of this patent is extended or adjusted under 35 U.S.C. 154(b) by 1067 days.

(21) Appl. No.: 12/349,248

(22) Filed: Jan. 6, 2009

(65) Prior Publication Data
US 2010/0034309 A1 Feb. 11, 2010

(30) Foreign Application Priority Data
Aug. 11, 2008 (TW) .............................. 97130589 A

(51) Int. Cl.
*H04B 7/02* (2006.01)
*H04L 1/02* (2006.01)

(52) U.S. Cl. ............... 375/267; 375/259; 375/260
(58) Field of Classification Search .......... 375/267
See application file for complete search history.

(56) References Cited

U.S. PATENT DOCUMENTS

| 2004/0013207 A1* | 1/2004 | Sartori et al. | 375/297 |
| 2004/0022177 A1 | 2/2004 | Awad et al. | |
| 2012/0076238 A1* | 3/2012 | Catreux et al. | 375/299 |

* cited by examiner

*Primary Examiner* — Erin File
(74) *Attorney, Agent, or Firm* — Patterson Thuente Christensen Pedersen, P.A.

(57) ABSTRACT

A multiple input multiple output (MIMO) antenna system, a signal transmission method, a signal transmission apparatus and a computer program product for the MIMO antenna system are provided. The signal transmission method comprises the following steps of transmitting a signal with a first signal transmission mode and a first transmission power via a signal transmission channel; receiving a signal to noise ratio (SNR) of the signal; receiving an interference value of the signal transmission channel; obtaining a power weight value according to the interference value; determining a system threshold of the signal transmission channel to the SNR of the signal; determining a second signal transmission mode of the signal transmission channel based on the system threshold; and determining a second transmission power of the signal transmission channel according to the power weight value.

26 Claims, 6 Drawing Sheets

MULTIPLE INPUT MULTIPLE OUTPUT ANTENNA SYSTEM, SIGNAL TRANSMISSION METHOD, SIGNAL TRANSMISSION APPARATUS, AND COMPUTER PROGRAM PRODUCT FOR THE MULTIPLE INPUT MULTIPLE OUTPUT ANTENNA SYSTEM

This application claims the benefit of priority based on Taiwan Patent Application No. 097130589, filed on Aug. 11, 2008, the contents of which are incorporated herein by reference in their entirety.

CROSS-REFERENCES TO RELATED APPLICATIONS

Not applicable.

BACKGROUND OF THE INVENTION

1. Field of the Invention

The present invention is related to a multiple input multiple output (MIMO) antenna system, a signal transmission method, a signal transmission apparatus and a computer program product for the MIMO antenna system. More particularly, the present invention is related to an MIMO antenna system, a signal transmission method, a signal transmission apparatus and a computer program product for the MIMO antenna system that are capable of adjusting a transmission power and a transmission mode of a signal.

2. Descriptions of the Related Art

As mobile communication systems have evolved from the third generation (3G) to later generations, such as the beyond third generation or the fourth generation, limited spectrum resources have hindered the development of the wireless communication technology. To increase the data rate and more efficiently utilize the spectrum, some technologies and schemes have been used to improve the spectrum utilization factor, such as optimization modulation schemes, program code multiplexing systems or MIMO technologies. Over recent years, MIMO technology has been widely applied in the industry. For example, the emerging Worldwide Interoperability for Microwave Access (WiMAX) standard and the new generation of Wireless Local Area Network (WLAN) are both incorporated with the MIMO technology.

MIMO systems indicate that signals are transmitted and received through multiple antennas synchronously. The MIMO system adopts a plurality of antennas both at the transmitting end and the receiving end, so that data can be transmitted via a plurality of signal transmission channels to increase the data rate. More specifically, a signal is divided into multiple portions at the transmitting end for synchronous transmission through a plurality of antennas. Because individual portions of the signal are transmitted through different signal transmission channels, they may arrive at the receiving end at different times. To prevent failure of recombination due to the different received times of individual portions, the receiving end has a plurality of antennas to receive these signals simultaneously. By digital signal processing and re-computation, the separate signal portions are then recombined into the original signal rapidly and properly.

By dividing the signal, the traffic in the single signal transmission channel can be decreased so that the signal transmission distance may be increased. Accordingly, MIMO technology has been able to speed up the signal transmission and avoid the use of additional spectrum, as well as increase the signal transmission distance. Therefore, many wireless network apparatuses have adopted MIMO technology to meet the increased requirements of signal transmission speed and distance. Thus, MIMO technology has become a key technology that must be adopted in the new generation of mobile communication systems.

Compared to a single-antenna system, an MIMO antenna system is capable of receiving a larger data amount and consequently, has a higher data rate. In the MIMO antenna system, a signal transmission channel may be established between each of the transmitting antennas at the transmitting end and a corresponding receiving antenna at the receiving end. Since channel conditions may not be all the same among the signal transmission channels, wireless network apparatus manufacturers usually use adaptive modulation coding (AMC) technology to transmit the divided signals. With AMC technology, when a signal transmission channel is in good condition, i.e., a low signal error rate or a high signal to noise ratio (SNR), the signal is transmitted in a transmission mode featuring a higher transmission speed. Conversely, the signal is transmitted in a transmission mode featuring a lower transmission speed. In this way, a better data throughput is achieved in the MIMO antenna system. Here, the data throughput is defined as the number of correct signals received by the receiving end within a unit time.

To implement the AMC technology, the conventional practice is to acquire characteristics of the individual signal transmission channels by simulation or practical measurements, and to predetermine a system threshold value related to the signal transmission channels. Then, during the operation of the MIMO antenna system, a signal transmission mode will be determined for the signal transmission channels according to the predetermined system threshold value. Table 1 (below) shows the signal transmission modes versus predetermined system threshold values in a conventional MIMO antenna system.

TABLE 1

| Modulation scheme, Code rate | Data rate (kbits/sec) | Range of SNR |
|---|---|---|
| QPSK, ½ | 228 | SNR < 10 dB |
| 16QAM, ½ | 462 | 10 dB ≦ SNR < 32 dB |
| 64QAM, ⅔ | 942 | SNR ≧ 32 dB |

In table 1, the signal transmission modes (modulation scheme, code rate) are (QPSK, ½), (16 QAM, ½) and (64 QAM, ⅔), while the predetermined system threshold values are set to be 10 dB and 32 dB. In the conventional MIMO antenna system, if the receiving end measures an SNR of the signal transmitted via a first signal transmission channel to be 20 dB, which falls within an SNR range of 10 dB≦SNR<32 dB, the transmitting end may set the transmission mode of the first signal transmission channel to be (16 QAM, ½), which corresponds to a data rate of 462 kbits/sec. If an SNR of the signal transmitted via a second signal transmission channel in the MIMO antenna system is measured to be 60 dB, which falls within an SNR range of SNR≧32 dB, the transmitting end will set the transmission mode of the second signal transmission channel to be (64 QAM, ⅔), which corresponds to a data rate of 942 kbits/sec. The SNR of the signal transmitted via the second signal transmission channel is much higher than that of the signal transmitted via the first signal transmission channel, which implies that the second signal transmission channel experiences a better channel condition than the first signal transmission channel. The second signal transmission channel may use a transmission mode with a higher data rate to transmit a signal. In this way, the MIMO antenna system using AMC technology can maximize the data throughput.

However, in a realistic environment, parameters related to each signal transmission channels of an MIMO antenna system vary with time. If the related parameters of a signal transmission channel changed after a period of time due to environmental changes while the corresponding system threshold value of the signal transmission channel remains the same, the overall data throughput of the MIMO antenna system will be adversely affected because of setting the wrong transmission mode.

Accordingly, it is important to decrease the error rate of data transmissions in an MIMO antenna system when the related parameters of the signal transmission channel vary with time.

SUMMARY OF THE INVENTION

One objective of this invention is to provide an MIMO antenna system, a signal transmission method and a computer program product for the MIMO antenna system. The MIMO antenna system has a first signal transmission channel and at least one second signal transmission channel. The MIMO antenna system is capable of adjusting a system threshold value related to a signal transmission mode, and a power weight value related to a signal transmission power according to channel conditions of the signal transmission channels to mitigate interference among the signal transmission channels and increase the data throughput of the MIMO antenna system.

The MIMO antenna system of this invention comprises a first signal transmission apparatus and a second signal transmission apparatus. The first signal transmission apparatus is configured to transmit a signal with a first transmission mode and a first transmission power via the first signal transmission channel. The second signal transmission apparatus is configured to calculate and transmit an interference value of the first signal transmission channel and to calculate and transmit an SNR of the signal after receiving the signal. The interference value is related to a transmission power of the at least one second signal transmission channel. The first signal transmission apparatus calculates a power weight value according to the interference value, sets a system threshold value of the first signal transmission channel according to the SNR of the signal, determines a second transmission power of the first signal transmission channel according to the power weight value, and determines a second transmission mode of the first signal transmission channel according to the system threshold value.

The signal transmission method for the MIMO antenna system of this invention comprises the following steps of: enabling a first signal transmission apparatus to transmit a signal with a first transmission mode and a first transmission power via the first signal transmission channel; enabling a second signal transmission apparatus to receive the signal; enabling the second signal transmission apparatus to calculate and transmit an interference value of the first signal transmission channel, wherein the interference value is related to a transmission power of the at least one second signal transmission channel; enabling the first signal transmission apparatus to calculate a power weight value according to the interference value; enabling the second signal transmission apparatus to calculate and transmit an SNR of the signal; enabling the first signal transmission apparatus to set a system threshold value of the first signal transmission channel according to the SNR of the signal; enabling the first signal transmission apparatus to determine a second transmission power of the first signal transmission channel according to the power weight value; and enabling the first signal transmission apparatus to determine a second transmission mode of the first signal transmission channel according to the system threshold value.

This invention further provides a computer program product comprising a plurality of instructions stored in a computer readable medium for the MIMO antenna system of this invention to perform the signal transmission method described above.

Another objective of this invention is to provide a signal transmission apparatus, a signal transmission method and a computer program product for the signal transmission apparatus. The signal transmission apparatus is used for an MIMO antenna system having a first signal transmission channel and at least one second signal transmission channel. The signal transmission apparatus is capable of adjusting a system threshold value related to a signal transmission mode, and a power weight value related to a signal transmission power according to channel conditions of the signal transmission channels. As a result, the interference among the signal transmission channels is mitigated, thereby, increasing the data throughput of the MIMO antenna system.

Another signal transmission apparatus of this invention comprises at least one transmission unit, a calculation module, a microprocessor and an adjustment module. The at least one transmission unit is configured to transmit a signal with a first transmission mode and a first transmission power via the first signal transmission channel, and to receive an SNR of the signal and an interference value of the first signal transmission channel. The calculation module is configured to calculate a power weight value according to the interference value of the first transmission channel. The microprocessor is configured to set a system threshold value of the first signal transmission channel according to the SNR of the signal. The adjustment module is configured to determine a second transmission mode of the first signal transmission channel according to the system threshold value, and determine a second transmission power of the first signal transmission channel according to the power weight value. The interference value is related to a transmission power of the at least one second signal transmission channel.

Also, another signal transmission method of this invention comprises the following steps of: enabling at least one transmission unit to transmit a signal with a first transmission mode and a first transmission power via the first signal transmission channel; enabling the at least one transmission unit to receive an SNR of the signal and an interference value of the first signal transmission channel, wherein the interference value is related to a transmission power of the at least one second signal transmission channel; enabling a calculation module to calculate a power weight value according to the interference value; enabling a microprocessor to set a system threshold value of the first signal transmission channel according to the SNR of the signal; and enabling an adjustment module to determine a second transmission mode of the first signal transmission channel according to the system threshold value, and determine a second transmission power of the first signal transmission channel according to the power weight value.

Further, another computer program product stored in a computer readable medium for the signal transmission apparatus of this invention to perform the signal transmission method described above.

In summary, the MIMO antenna system, the signal transmission method, the signal transmission apparatus and the computer program product for the MIMO antenna system of this invention are adapted to dynamically adjust the system threshold value according to the SNR of the signal transmitted via the signal transmission channel, and switch among transmission modes of the signal transmission channels accordingly. This invention may further calculate the interference caused by other signal transmission channels and, based on the calculated interference, allocate a transmission power for the signal transmission channels to mitigate data transmission errors caused by interference among the signal transmission channels and increase the data throughput of the MIMO antenna system. In this way, the shortcomings of the prior art are overcome.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

This invention provides an MIMO antenna system, a signal transmission method, a signal transmission apparatus and a computer program product for the MIMO antenna system. The following description of embodiments of this invention is only for purposes of illustration, not limitation. In the following embodiments and the attached drawings, elements unrelated to this invention are omitted from depiction.

Figure 1:
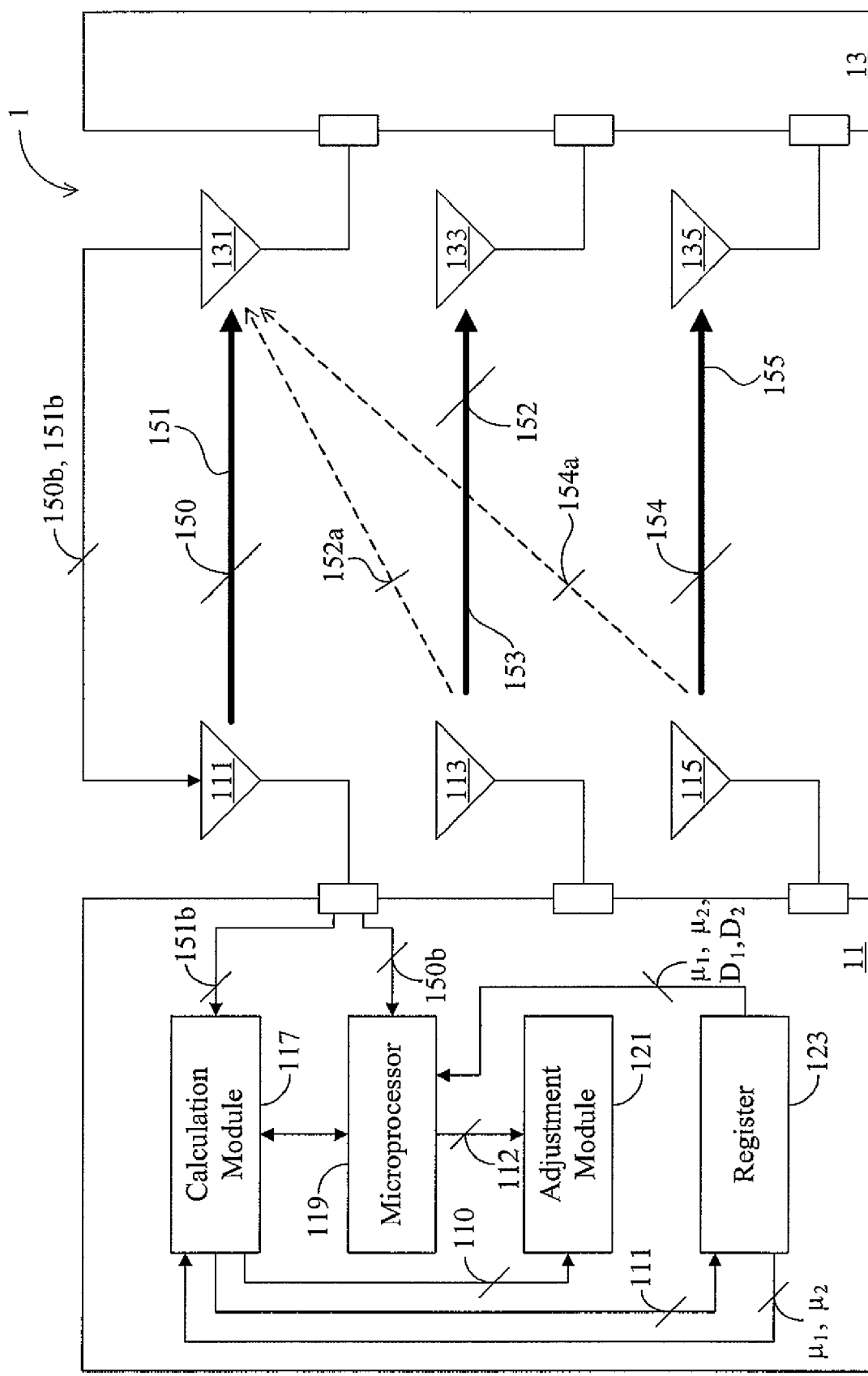
FIG. 1 is a schematic view illustrating a first embodiment of this invention.

FIG. 1 depicts a first embodiment of this invention, which is an MIMO antenna system 1. In this embodiment the MIMO antenna system 1 is a system with a hybrid automatic retransmission request (HARQ) structure. More specifically, when receiving a signal transmitted from a transmitting end of the MIMO antenna system 1, a receiving end of the MIMO antenna system 1 determines whether the signal is correct. If the signal is determined to be correct, the receiving end feedbacks an acknowledgment (ACK) to the transmitting end to inform that the signal has been received correctly and no retransmission of the signal is needed. On the other hand, if the signal is determined to be incorrect, the receiving end feedbacks a negative acknowledgement (NACK) to inform the transmitting end to retransmit the signal. In other examples, the MIMO antenna system 1 may be any system with any kind of feedback mechanism structure. The type of feedback mechanism structure that the MIMO antenna system 1 adopts is not limited in this invention.

The MIMO antenna system 1 comprises a first signal transmission apparatus 11 and a second signal transmission apparatus 13. In this embodiment, the first signal transmission apparatus 11 is a signal transmitting end, while the second signal transmission apparatus 13 is a signal receiving end. The first signal transmission apparatus 11 comprises a plurality of transmission units 111, 113, 115, a calculation module 117, a microprocessor 119, an adjustment module 121 and a register 123. The second signal transmission apparatus 13 also has a plurality of transmission units 131, 133, 135. Thus, a plurality of signal transmission channels 151, 153, 155 are respectively established in the MIMO antenna system 1 by the transmission units 111, 113, 115 of the first signal transmission apparatus 11 and the transmission units 131, 133, 135 of the second signal transmission apparatus 13.

For purposes of simplicity, in this embodiment, the first, second and third transmission units 111, 113, 115 will be taken as an example to describe the transmission units of the first signal transmission apparatus 11. The first, second and third transmission units 131, 133, 135 will be taken as an example to describe the transmission units of the second signal transmission apparatus 13. The first, second and third signal transmission channels 151, 153, 155 will be taken as an example to describe the signal transmission channels of the MIMO antenna system 1.

Although only three signal transmission channels 151, 153, 155 in the MIMO antenna system 1 are depicted in FIG. 1, the number of signal transmission channels of the MIMO antenna system is not limited in this invention. In other words, those of ordinary skill in the art may readily implement more than three signal transmission channels in the MIMO antenna system based on the above description, and thus no further description will be made herein.

Figure 2:
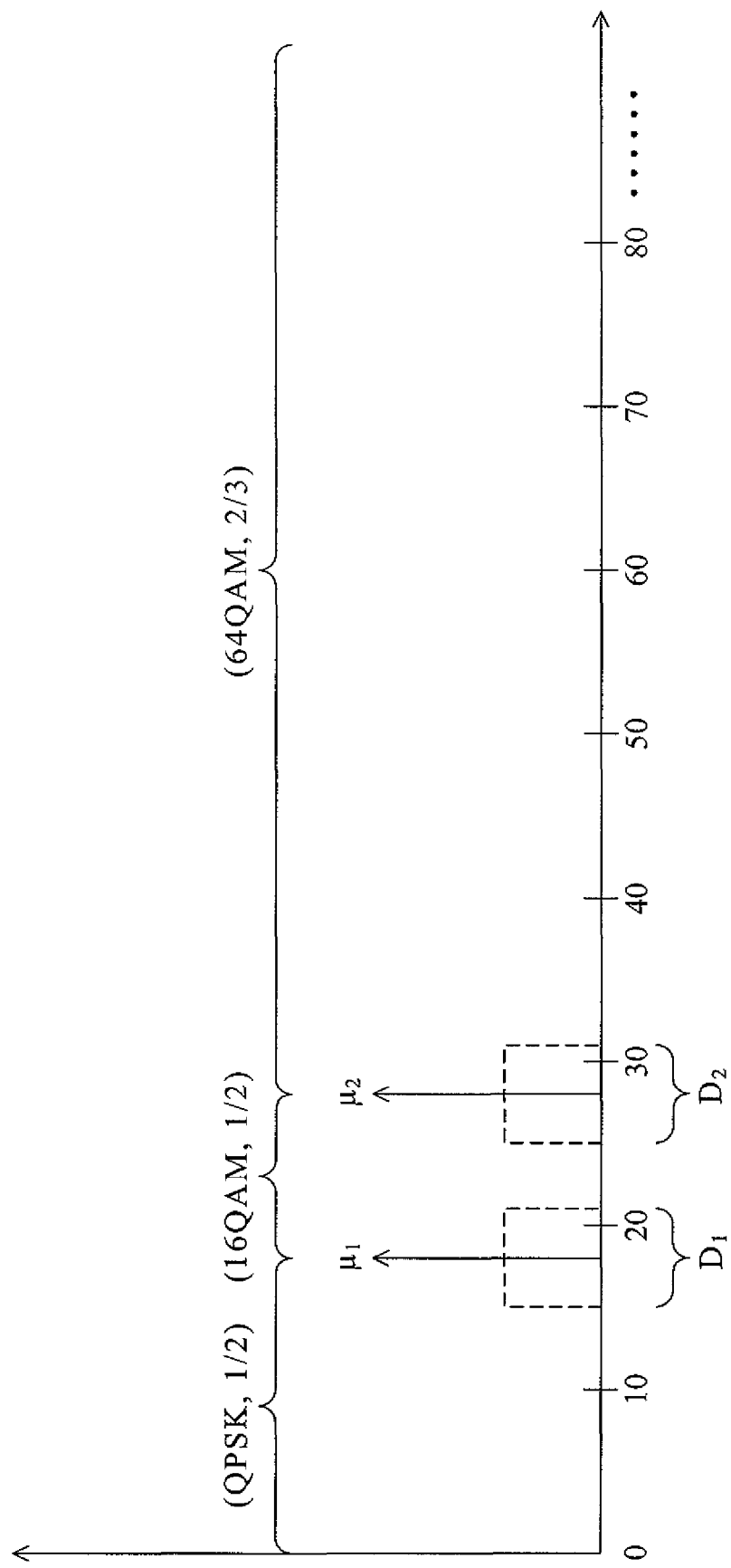
FIG. 2 is a schematic view illustrating related parameters in an MIMO antenna system of the first embodiment.

In this embodiment, each of the signal transmission channels 151, 153, 155 of the MIMO antenna system 1 has three transmission modes, i.e., a transmission mode (QPSK, ½) with a data rate of 228 kbits/sec, a transmission mode (16 QAM, ½) with a data rate of 469 kbits/sec and a transmission mode (64 QAM, ⅔) with a data rate of 924 kbits/sec. The register 123 of the first signal transmission apparatus 11 stores a first predetermined threshold value $\mu_1$, a second predetermined threshold value $\mu_2$, a first predetermined threshold range $D_1$ and a second predetermined threshold range $D_2$. The first predetermined threshold value $\mu_1$ is 18 dB, the second predetermined threshold value $\mu_2$ is 28 dB, and both the first predetermined threshold range $D_1$ and the second predetermined threshold range $D_2$ are 6 dB. As can be seen from FIG. 2 and the above description, three SNR ranges can be formed by the first predetermined threshold value $\mu_1$ and the second predetermined threshold value $\mu_2$, i.e., 0 dB~18 dB, 18 dB~28 dB and from 28 dB above. Depending on the SNR range that falls within, the MIMO antenna system 1 transmits a signal in one of the three transmission modes. Meanwhile, the first predetermined threshold range $D_1$ and the second predetermined threshold range $D_2$ defined according to the first predetermined threshold value $\mu_1$ and the second predetermined threshold value $\mu_2$ are 15 dB~21 dB and 25 dB~31 dB respectively.

More specifically, the number, kinds and values of the transmission modes and the predetermined threshold values are not limited in the MIMO antenna system 1 of this invention, and those of ordinary skill in the art may define the number of transmission modes and values of the predetermined thresholds in the MIMO antenna system according to the existing MIMO technologies, and thus no further description will be made herein.

Hereinafter, operations and functions of the MIMO antenna system 1 of this invention will be described in detail. Initially, the first signal transmission apparatus 11 transmits a first signal 150 from the first transmission unit 111 to the second signal transmission apparatus 13 with a first transmission mode (e.g., 16 QAM, ½) and a first transmission power via the first signal transmission channel 151. At the same time, the first signal apparatus 11 transmits a second signal 152 from the second transmission unit 113 to the second signal transmission apparatus 13 via the second signal transmission channel 153. Meanwhile, the first signal apparatus 11 transmits a third signal 154 from the third transmission unit 115 to the second signal transmission apparatus 13 via the third signal transmission channel 155.

When the first, second and third signals 150, 152, 154 are transmitted, the first transmission unit 131 of the second signal transmission apparatus 13 receives the first signal 150 via the first transmission channel 151. However, the first transmission unit 131 may further receive interference 152a from the second signal 152 and interference 154a from the third signal 154. For example, if the second signal 152 is transmitted with an overly high transmission power and/or the first signal transmission channel 151 is too close in distance to the second signal transmission channel 153, the second signal 152 will have an impact on the first signal 150 transmitted over the first signal transmission channel 151, thus causing interference 152a. Similarly, if the third signal 154 is transmitted with an overly high transmission power and/or the first signal transmission channel 151 is too close in distance to the third signal transmission channel 155, the third signal 154 will have an impact on the first signal 150 transmitted over the first signal transmission channel 151, thus causing interference 154a.

Likewise, expect for the second signal 152 transmitted via the second signal transmission channel 153, the second transmission unit 133 of the second signal transmission apparatus 13 may also receive interference (not shown) from the first signal 150 and the third signal 154. The third transmission unit 135 of the second signal transmission apparatus 13 may also receive interference (not shown) from the first signal 150 and the second signal 152 expect for the third signal 154 transmitted via the third signal transmission channel 155.

Upon receiving the first signal 150 via the first transmission unit 131, the second signal transmission apparatus 13 calculates an SNR 150b of the first signal 150 and an interference value 151b of the first signal transmission channel 151. Briefly speaking, the second signal transmission apparatus 13 calculates and quantizes the interference 152a from the second signal 152 and the interference 154a from the third signal 154 in a physical way to derive the interference value 151b. Then, the second signal transmission apparatus 13 transmits the SNR 150b of the first signal 150 and the interference value 151b of the first signal transmission channel 151 from the first transmission unit 131 to the first signal transmission apparatus 11. Meanwhile, if the second signal transmission apparatus 13 determines that the first signal 150 is correct, the first transmission unit 131 feedbacks an ACK to the first signal transmission apparatus 11 to inform that no retransmission of the first signal 150 is needed. Conversely, if the second signal transmission apparatus 13 determines that the first signal 150 is incorrect, the first transmission unit 131 feedbacks an NACK to the first signal transmission apparatus 11 to require the first signal transmission apparatus 11 a retransmission of the first signal 150.

After the first transmission unit 111 of the first signal transmission apparatus 11 receives the SNR 150b of the first signal 150 and the interference value 151b of the first signal transmission channel 151, the calculation module 117 calculates a power weight value 110 according to the interference value 151b of the first signal transmission channel 151 by an iterative method. According to the power weight value 110, the adjustment module 121 allocates a second transmission power to the first signal transmission channel 151.

More specifically, the calculation module 117 uses a water-filling algorithm to calculate the power weight value 110 according to the interference value 151b of the first signal transmission channel 151. According to the water-filling algorithm, without increasing the total transmission power of the first, second and third signal transmission channels 151, 153, 155 of the MIMO antenna system 1, signal transmission channels with lower interference values are allocated a larger transmission power, while those with higher interference values are allocated a smaller transmission power.

For example, if the interference value 151b of the first signal transmission channel 151 is smaller than the interference value (not shown) of the second signal transmission channel 153, the calculation module 117 will increase the power weight value 110 of the first signal transmission channel 151, and decrease the power weight value (not shown) of the second signal transmission channel 153, so that a balance in transmission power can be achieved among the first, second and third signal transmission channels 151, 153, 155 through continuous calculations with the water-filling algorithm. Meanwhile, through the aforesaid calculation process, the interferences of the first, second and third signal transmission channels 151, 153, 155 from each other are converged respectively. The adjustment of power weight values of a corresponding signal transmission channel may be made by those of ordinary skill in the art based on the above description of the water-filling algorithm and the existing MIMO technology, thus will not be further described herein.

Upon completing the adjustment of the power weight values of the corresponding signal transmission channels, the adjustment module 121 determines a second transmission power of the first signal transmission channel 151 according to the power weight value 110 of the first signal transmission 151. The second transmission power of the first signal transmission channel 151 is higher than the previous first transmission power, so that the first transmission unit 111 of the first signal transmission apparatus 11 can transmit the next signal with the second transmission power.

The microprocessor 119 of the first signal transmission apparatus 11 sets a system threshold value 112 of the first signal transmission channel 151 according to the SNR 150b of the first signal 150. More specifically, if the transmission unit 111 of the first signal transmission apparatus 11 receives an ACK transmitted by the first transmission unit 131 of the second signal transmission apparatus 13, the microprocessor 119 determines whether the SNR 150b of the first signal 150 falls within the first predetermined threshold range D1 or the second predetermined threshold range D2 (i.e., 15 dB~21 dB and 25 dB~31 dB respectively). If the SNR 150b of the first signal 150 does not fall within either of the predetermined threshold ranges, the adjustment module 121 determines a second transmission mode of the first signal transmission channel 151 according to the AMC technology of the prior art for, so that the first transmission unit 111 of the first signal transmission apparatus 11 can transmit the next signal with the second transmission mode.

On the other hand, if the SNR 150b of the first signal 150 falls within either of the predetermined threshold ranges, the microprocessor 119 then determines whether the SNR 150b is less than the first predetermined threshold value $\mu_1$ (i.e., 18 dB) or the second predetermined threshold value $\mu_2$ (i.e., 28 dB).

Figure 3:
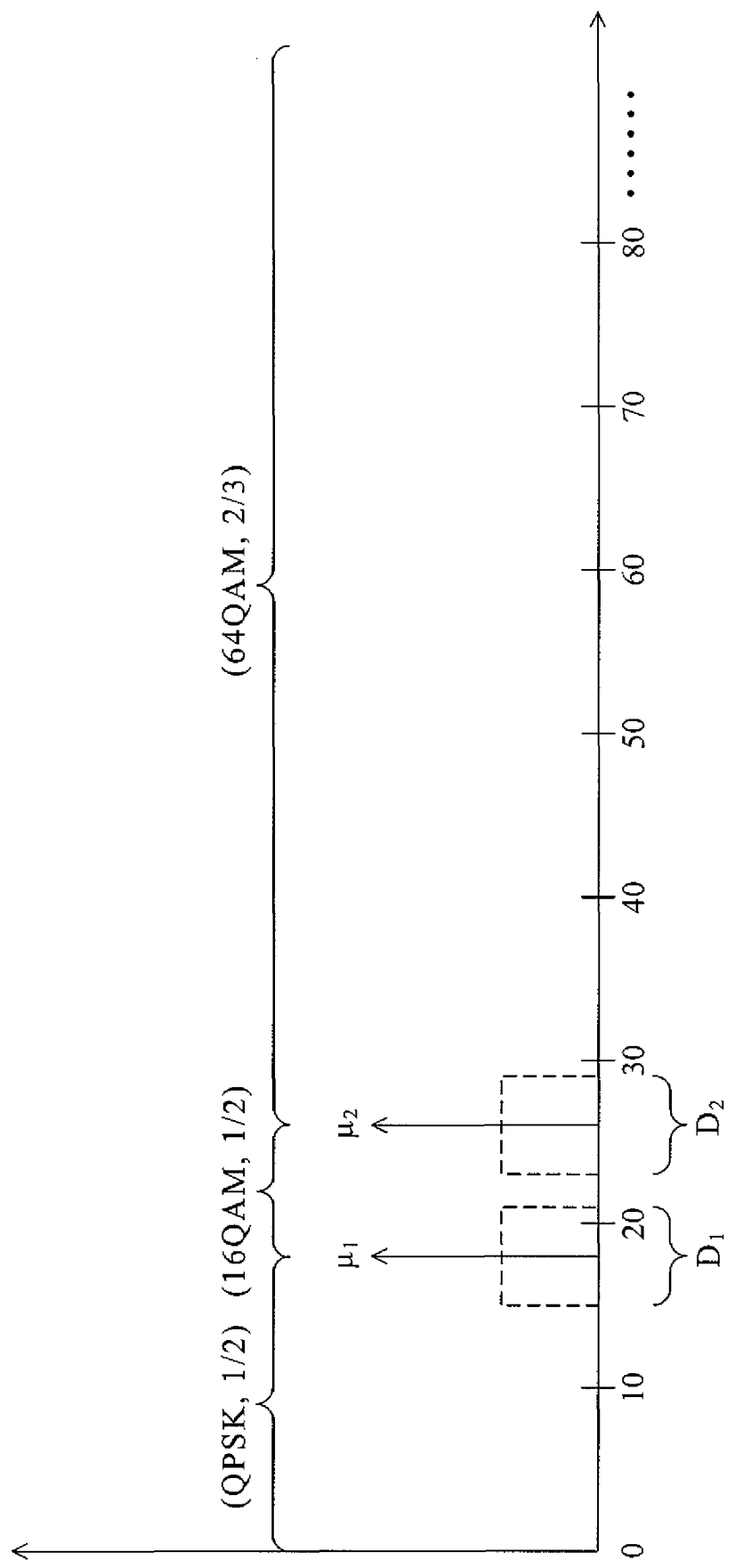
FIG. 3 is a schematic view illustrating updated related parameters in the MIMO antenna system of the first embodiment.

For example, if the SNR 150b of the first signal 150 is 27 dB, the microprocessor 119 determines that the SNR 150b of the first signal 150 is less than the second predetermined threshold value $\mu_2$ (i.e., 28 dB). In this case, the calculation module 117 of the first signal transmission apparatus 11 retrieves the second predetermined threshold value $\mu_2$ from the register 123 and subtracts a correction value from the second predetermined threshold value $\mu_2$. Here, the correction value may be designed depending on different conditions and is not limited in this invention. In this embodiment the correction value is set to be 2 dB. The microprocessor 119 sets the system threshold value 112 of the first signal transmission channel 151 to be a result of subtracting the correction value from the second predetermined threshold value $\mu_2$, i.e., 26 dB. Next, the calculation module 117 updates the second predetermined threshold value $\mu_2$ stored in the register 123 to 26 dB. Simultaneously, the second predetermined threshold range $D_2$ is updated to 23 dB~29 dB. These updated parameters of the MIMO antenna system 1 are shown in FIG. 3.

Here, the result of subtracting the correction value from the second predetermined threshold value $\mu_2$ (i.e., 26 dB) still falls within the original second predetermined threshold range $D_2$ (i.e., 25 dB~31 dB). Subsequently, according to the system threshold value 112, the adjustment module 121 switches the transmission mode of the first signal transmission channel 151 from the first transmission mode (16 QAM, ½) with the data rate of 462 kbits/sec to the second transmission mode (64 QAM, ⅔) with a data rate of 924 kbits/sec, so that the first signal transmission unit 111 will transmit the next signal with the second transmission mode featuring a higher data rate and the determined second transmission power.

Figure 4:
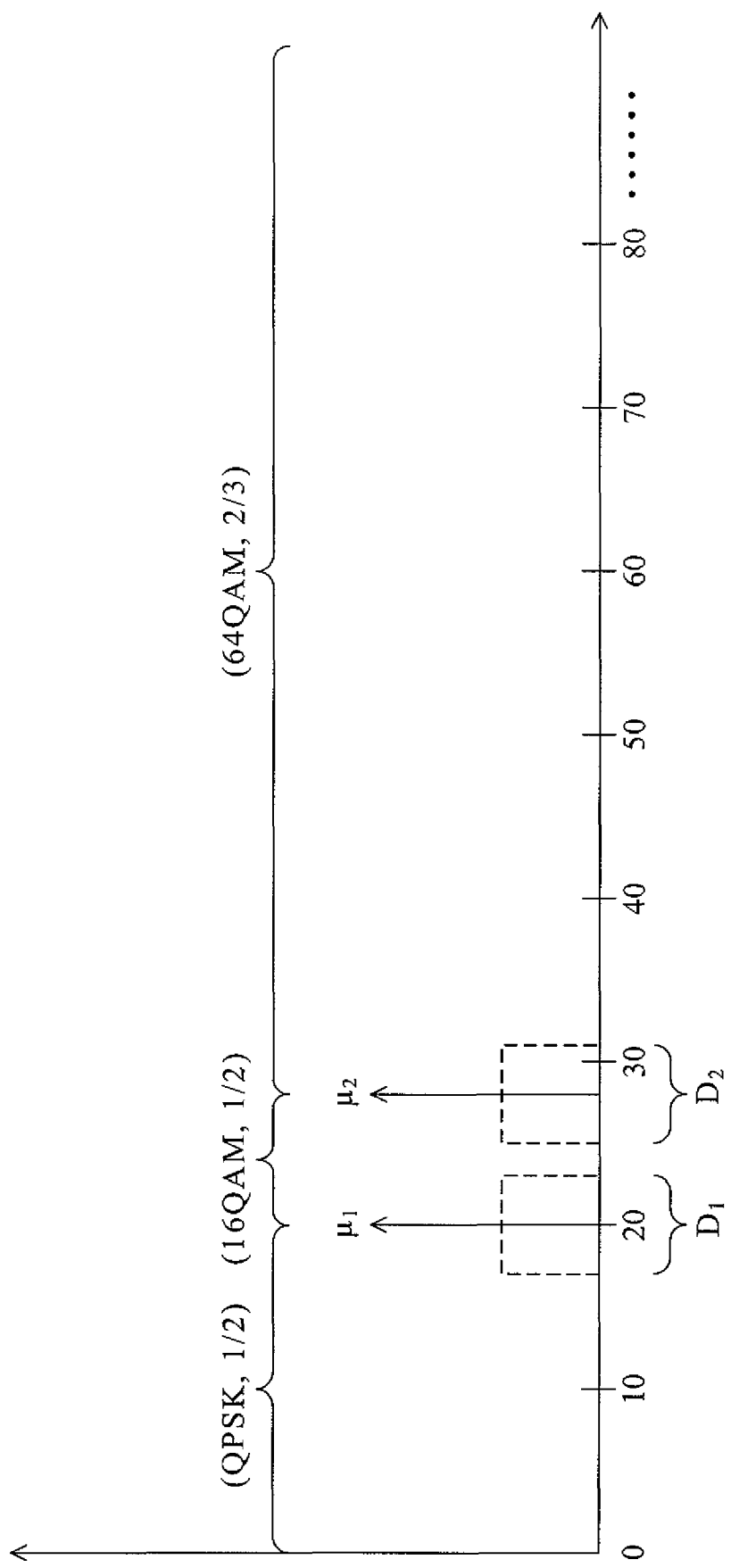
FIG. 4 is another schematic view illustrating updated related parameters in the MIMO antenna system of the first embodiment.

On the other hand, if the SNR 150b of the first signal 150 is 20 dB, the microprocessor 119 determines that the SNR 150b of the first signal 150 is higher than the first predetermined threshold value $\mu_1$ (i.e., 18 dB). In this case, the calculation module 117 of the first signal transmission apparatus 11 retrieves the first predetermined threshold value $\mu_1$ from the register 123 and adds a correction value to the first predetermined threshold value $\mu_1$. Here, the correction value may be designed depending on different conditions and is not limited in this invention. In this embodiment, the correction value is defined to be 2 dB. The microprocessor 119 sets the system threshold value 112 of the first signal transmission channel 151 to be a result of adding the correction value to the first predetermined threshold value $\mu_1$, i.e., 20 dB. Next, the calculation module 117 updates the first predetermined threshold value $\mu_1$ stored in the register 123 to 20 dB. Simultaneously, the first predetermined threshold range $D_1$ is updated to 17 dB~23 dB. These updated parameters of the MIMO antenna system 1 are shown in FIG. 4.

Here, after adding the correction value to the first predetermined threshold value $\mu_1$ (i.e., 20 dB), the added result still falls within the original first predetermined threshold range $D_1$ (i.e., 15 dB~21 dB). Subsequently, according to the system threshold value 112, the adjustment module 121 switches the transmission mode of the first signal transmission channel 151 from the first transmission mode (16 QAM, ½), with a data rate of 462 kbits/sec, to the second transmission mode (QPSK, ½) with a data rate of 228 kbits/sec, so that the first signal transmission unit 111 will transmit the next signal with the second transmission mode featuring a lower data rate and the determined second transmission power.

Generally, the original first predetermined threshold value $\mu_1$ (18 dB) and the original second predetermined value $\mu_2$ (28 dB) may be adjusted dynamically by the calculation module 117 according to the SNR 150b of the first signal 150 each time, and the aforesaid determination made by the microprocessor 119 to reduce data transmission errors caused by setting the wrong transmission mode and increase the data throughput of the MIMO antenna system 1.

Figure 5:
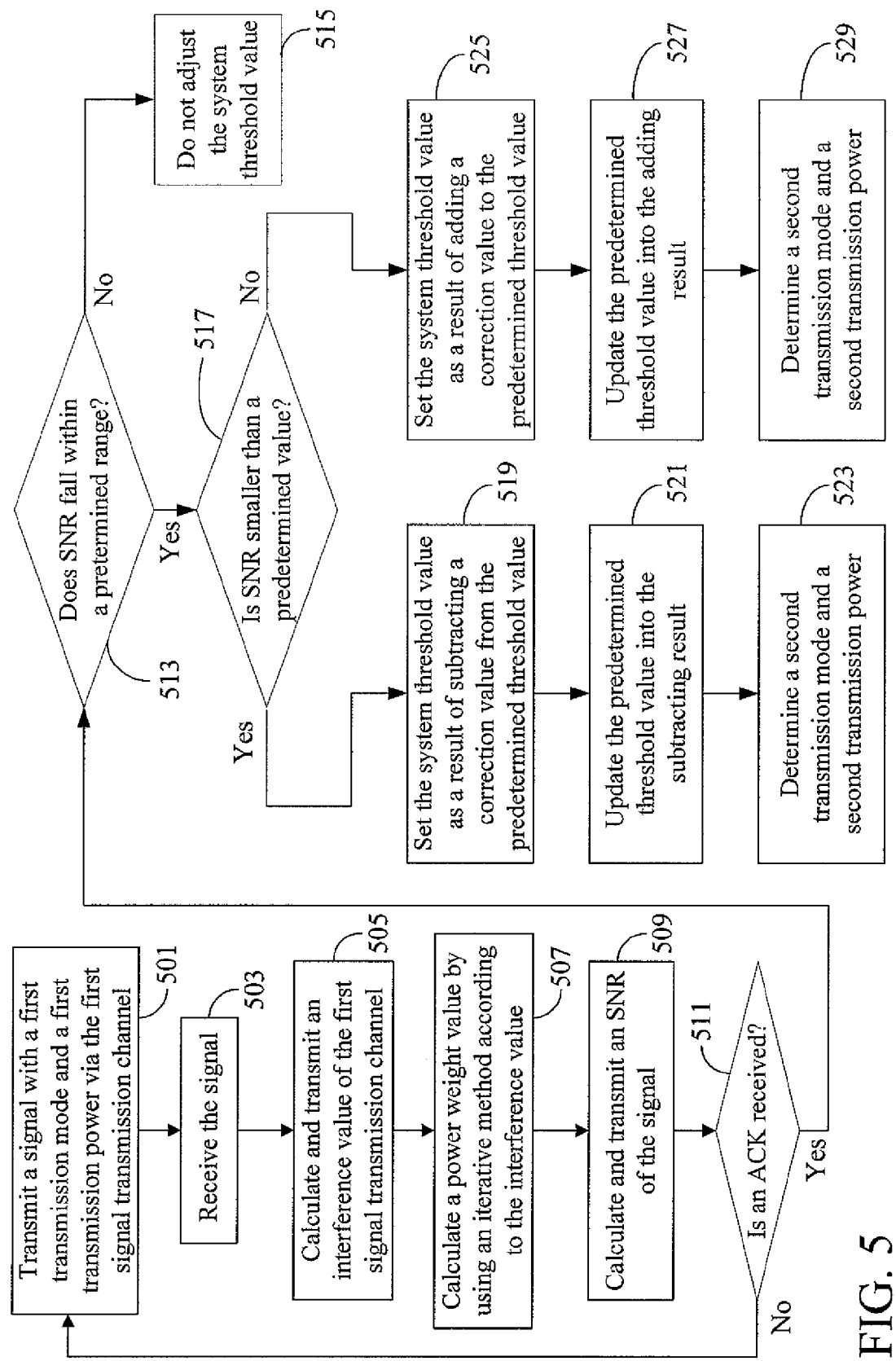
FIG. 5 is a flow chart illustrating a second embodiment of this invention.

FIG. 5 depicts a second embodiment of this invention, which is a signal transmission method adapted for an MIMO antenna system, e.g., the MIMO antenna system 1 described in the first embodiment. The MIMO antenna system has a first signal transmission channel and at least one second signal transmission channel. More specifically, the signal transmission method of the second embodiment may be implemented by a computer program product. When the computer program product is loaded in a computer and a plurality of instructions contained therein is executed, the signal transmission method of the second embodiment will be accomplished. This computer program product may be stored in a tangible machine-readable medium, such as a read only memory (ROM), a flash memory, a floppy disk, a hard disk, a compact disk, a mobile disk, a magnetic tape, a database accessible to networks, or any other storage media with the same function and well known to those skilled in the art.

The signal transmission method of the second embodiment comprises the following steps. Initially in step 501, a first signal transmission apparatus transmits a signal with a first transmission mode and a first transmission power via the first signal transmission channel. Then, in step 503, a second signal transmission apparatus receives the signal. Next, in step 505, the second signal transmission apparatus calculates and transmits an interference value of the first signal transmission channel. The interference value is related to a transmission power of the at least one second signal transmission channel. In step 507, a power weight value is calculated using an iterative method according to the interference value. Subsequently in step 509, the second signal transmission apparatus calculates and transmits an SNR of the signal. Next, in step 511, it is determined whether the first signal transmission apparatus has received an ACK of the signal from the second signal transmission apparatus. If not, the process returns back to step 501 for the first signal transmission apparatus to continue transmitting a signal with a first transmission mode and a first transmission power via the first signal transmission channel.

If the first signal transmission apparatus receives an ACK of the signal from the second signal transmission apparatus in step 511, it is determined in step 513 whether the SNR of the signal falls within a predetermined threshold range. If not, the process proceeds to step 515 without adjusting the system threshold value. Conversely, if it is determined in step 513 that the SNR of the signal falls within the predetermined threshold range, the first signal transmission apparatus determines whether the SNR of the signal is less than a predetermined threshold value in step 517. If so, then in step 519, the first signal transmission apparatus subtracts a correction value from the predetermined threshold value and sets the system threshold value to be the subtracting result. Then, in step 521, the first signal transmission apparatus updates the predetermined threshold value into the subtracting result. Here, the subtracting result falls within the predetermined threshold range. Finally, in step 523, a second transmission mode is determined for the first signal transmission channel according to the system threshold value, while a second transmission power is determined for the first signal transmission channel according to the power weight value. Here, a data rate of the first transmission mode is lower than that of the second transmission mode.

If it is determined in step 517 that the SNR of the signal is no less than the predetermined threshold value, the first signal transmission apparatus adds a correction value to the predetermined threshold value and sets the system threshold value to be a result of adding the correction value to the predetermined threshold value in step 525. Then, in step 527, the first signal transmission apparatus updates the predetermined threshold value into the adding result. Here, the adding result falls within the predetermined threshold range. Finally, in step 529, a second transmission mode is determined for the first signal transmission channel according to the system threshold value, while a second transmission power is determined for the first signal transmission channel according to the power weight value. Here, a data rate of the first transmission mode is higher than that of the second transmission mode.

In addition to the aforesaid steps, the second embodiment can also execute all the operations and functions set forth in the first embodiment. The methods in which the second embodiment executes these operations and functions will be readily appreciated by those of ordinary skill in the art based on the explanation of the first embodiment, and thus will not be further described herein.

Figure 6:
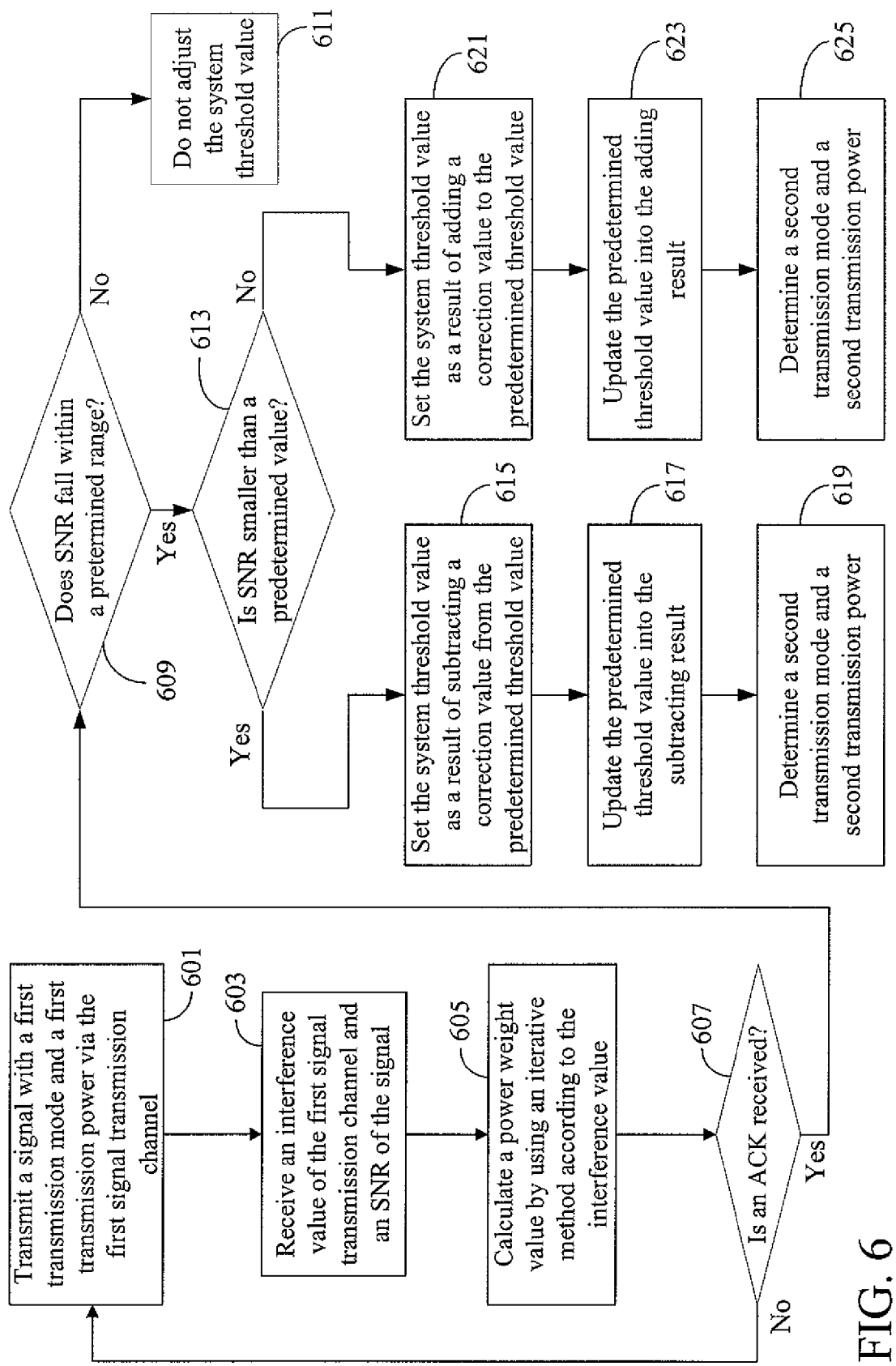
FIG. 6 is a flow chart illustrating a third embodiment of this invention.

FIG. 6 depicts a third embodiment of this invention, which is a signal transmission method adapted for use in a signal transmission apparatus, e.g., the first signal transmission apparatus 11 of the MIMO antenna system 1 described in the first embodiment. More specifically, the signal transmission method of the third embodiment may be implemented by a computer program product. When the computer program product is loaded in a computer and a plurality of instructions contained therein is executed, the signal transmission method of the third embodiment will be accomplished. This computer program product may be stored in a tangible machine-readable medium, such as an ROM, a flash memory, a floppy disk, a hard disk, a compact disk, a mobile disk, a magnetic tape, a database accessible to networks, or any other storage media with the same function and well known to those skilled in the art.

The signal transmission method of the third embodiment comprises the following steps. Initially in step 601, a transmission unit transmits a signal with a first transmission mode and a first transmission power via a first signal transmission channel. Then, in step 603, the transmission unit receives an interference value of the first signal transmission channel and an SNR of the signal, in which the interference value is related to a transmission power of at least one second signal transmission channel. Next, in step 605, a calculation module calculates a power weight value using an iterative method according to the interference value. In step 607, it is determined whether an ACK of the signal is received. If not, the process returns back to step 601, where the transmission unit continues to transmit the signal with the first transmission mode and the first transmission power via the first signal transmission channel.

If the transmission unit receives an ACK of the signal in step 607, then, in step 609 a microprocessor determines whether the SNR of the signal falls within a predetermined threshold range. If not, the process proceeds to step 611 without adjusting the system threshold value. Conversely, if it is determined in step 609 that the SNR of the signal falls within the predetermined threshold range, then, in step 613 the microprocessor determines whether the SNR of the signal is less than a predetermined threshold value. If so, in step 615, a calculation module subtracts a correction value from the predetermined threshold value, and the microprocessor sets the system threshold value to be the result of subtracting the correction value from the predetermined threshold value. Then, in step 617, a register updates the predetermined threshold value into the subtracting result. Here, the subtracting result falls within the predetermined threshold range.

Finally, in step 619, an adjustment module determines a second transmission mode of the first signal transmission channel according to the system threshold value, and determines a second transmission power of the first signal transmission channel according to the power weight value. Here, a data rate of the first transmission mode is lower than that of the second transmission mode.

If the microprocessor determines in step 613 that the SNR of the signal is no less than the predetermined threshold value, then in step 621, the calculation module adds a correction value to the predetermined threshold value and the microprocessor sets the system threshold value to be a result of adding the correction value to the predetermined threshold value. Next, in step 623, the register updates the predetermined threshold value into the adding result. Here, the adding result falls within the predetermined threshold range. Finally, in step 625, a second transmission mode is determined for the first signal transmission channel according to the system threshold value, and a second transmission power is determined for the first signal transmission channel according to the power weight value. Here, a data rate of the first transmission mode is higher than that of the second transmission mode.

In addition to the aforesaid steps, the third embodiment can also execute all the operations and functions set forth in the first embodiment. The method in which the third embodiment executes these operations and functions will be readily appreciated by those of ordinary skill in the art based on the explanation of the first embodiment, and thus will not be further described herein.

According to the MIMO antenna system, and the signal transmission method, the signal transmission apparatus and the computer program product for the MIMO antenna system of this invention, the system threshold value can be adjusted dynamically according to an SNR of a signal and finally approach a proper system threshold value. Furthermore, by using an iterative method to derive a power weight value, a better balance in interference is achieved among the signal transmission channels. As a result a better data throughput is obtained in the MIMO antenna system.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A signal transmission method for a multiple input multiple output (MIMO) antenna system, the MIMO antenna system having a first signal transmission channel and at least one second signal transmission channel, the signal transmission method comprising the steps of:
   enabling a first signal transmission apparatus to transmit a signal with a first transmission mode and a first transmission power via the first signal transmission channel;
   enabling a second signal transmission apparatus to receive the signal;
   enabling the second signal transmission apparatus to calculate and transmit an interference value of the first signal transmission channel, wherein the interference value is related to a transmission power of the at least one second signal transmission channel;

enabling the first signal transmission apparatus to calculate a power weight value according to the interference value;

enabling the second signal transmission apparatus to calculate and transmit a signal to noise ratio (SNR) of the signal;

enabling the first signal transmission apparatus to receive an acknowledgement (ACK) of the signal from the second signal transmission apparatus;

enabling the first signal transmission apparatus to determine that the SNR of the signal is less than a predetermined threshold value;

enabling the first signal transmission apparatus to determine that the SNR of the signal falls within a predetermined threshold range;

enabling the first signal transmission apparatus to subtract a correction value from the predetermined threshold value;

enabling the first signal transmission apparatus to set a system threshold value as the subtracting result;

enabling the first signal transmission apparatus to update the predetermined threshold value into the subtracting result, wherein the subtracting result falls within the predetermined threshold range;

enabling the first signal transmission apparatus to determine a second transmission power of the first signal transmission channel according to the power weight value; and enabling the first signal transmission apparatus to determine a second transmission mode of the first signal transmission channel according to the system threshold value.

2. The signal transmission method as claimed in claim 1, wherein the step of determining the second transmission mode of the first signal transmission channel further comprises the step of:

enabling the first signal transmission apparatus to switch the first transmission mode into the second transmission mode according to the system threshold value.

3. A signal transmission method for a multiple input multiple output (MIMO) antenna system, the MIMO antenna system having a first signal transmission channel and at least one second signal transmission channel, the signal transmission method comprising the steps of:

enabling a first signal transmission apparatus to transmit a signal with a first transmission mode and a first transmission power via the first signal transmission channel;

enabling a second signal transmission apparatus to receive the signal;

enabling the second signal transmission apparatus to calculate and transmit an interference value of the first signal transmission channel, wherein the interference value is related to a transmission power of the at least one second signal transmission channel;

enabling the first signal transmission apparatus to calculate a power weight value according to the interference value;

enabling the second signal transmission apparatus to calculate and transmit a signal to noise ratio (SNR) of the signal;

enabling the first signal transmission apparatus to receive an ACK of the signal from the second signal transmission apparatus;

enabling the first signal transmission apparatus to determine that the SNR of the signal is larger than a predetermined threshold value;

enabling the first signal transmission apparatus to determine that the SNR of the signal falls within a predetermined threshold range;

enabling the first signal transmission apparatus to add a correction value to the predetermined threshold value;

enabling the first signal transmission apparatus to set a system threshold value as the adding result of;

enabling the first signal transmission apparatus to update the predetermined threshold value into the adding result, wherein the adding result falls within the predetermined threshold range;

enabling the first signal transmission apparatus to determine a second transmission power of the first signal transmission channel according to the power weight value; and enabling the first signal transmission apparatus to determine a second transmission mode of the first signal transmission channel according to the system threshold value.

4. The signal transmission method as claimed in claim 3, wherein the step of determining the second transmission mode of the first signal transmission channel further comprises the step of:

enabling the first signal transmission apparatus to switch the first transmission mode into the second transmission mode according to the system threshold value.

5. An MIMO antenna system, comprising:

a first signal transmission channel:

at least one second signal transmission channel;

a first signal transmission apparatus being configured to transmit a signal with a first transmission mode and a first transmission power via the first signal transmission channel; and a second signal transmission apparatus being configured to calculate and transmit an interference value of the first signal transmission channel, and to calculate and transmit an SNR of the signal after receiving the signal, wherein the interference value is related to a transmission power of the at least one second signal transmission channel;

wherein after receiving an ACK of the signal from the second signal transmission apparatus, the first signal transmission apparatus determines whether the SNR of the signal is less than a predetermined threshold value, determines whether the SNR of the signal falls within a predetermined threshold range, calculates a power weight value according to the interference value, sets a system threshold value of the first signal transmission channel according to the SNR of the signal, determines a second transmission power of the first signal transmission channel according to the power weight value, and determines a second transmission mode of the first signal transmission channel according to the system threshold value.

6. The MIMO antenna system as claimed in claim 5, wherein when the SNR of the signal is less than the predetermined threshold value and falls within the predetermined threshold range, the first signal transmission apparatus subtracts a correction value from the predetermined threshold value, sets the system threshold value as the subtracting result, and updates the predetermined threshold value into the subtracting result, wherein the subtracting result falls within the predetermined threshold range.

7. The MIMO antenna system as claimed in claim 6, wherein the first signal transmission apparatus switches the first transmission mode into the second transmission mode according to the system threshold value.

8. The MIMO antenna system as claimed in claim 5, wherein when the SNR of the signal is not less than the predetermined threshold value and falls within the predetermined threshold range, the first signal transmission apparatus adds a correction value to the predetermined threshold value, sets the system threshold value as the adding result of, and updates the predetermined threshold value into the adding result, wherein the adding result falls within the predetermined threshold range.

9. The MIMO antenna system as claimed in claim 8, wherein the first signal transmission apparatus switches the first transmission mode into the second transmission mode according to the system threshold value.

10. A computer program product stored in a computer readable medium for an MIMO antenna system to perform a signal transmission method, the MIMO antenna system having a first signal transmission channel and at least one second signal transmission channel, the computer program product comprising:

a first instruction for a first signal transmission apparatus to transmit a signal with a first transmission mode and a first transmission power via the first signal transmission channel;

a second instruction for a second signal transmission apparatus to receive the signal;

a third instruction for the second signal transmission apparatus to calculate and transmit an interference value of the first signal transmission channel, wherein the interference value is related to a transmission power of the at least one second signal transmission channel;

a fourth instruction for the first signal transmission apparatus to calculate a power weight value according to the interference value;

a fifth instruction for the second signal transmission apparatus to calculate and transmit an SNR of the signal;

a sixth instruction for the first signal transmission apparatus to receive an ACK of the signal from the second signal transmission apparatus;

a seventh instruction for the first signal transmission apparatus to determine that the SNR of the signal is less than a predetermined threshold value;

an eighth instruction for the first signal transmission apparatus to determine that the SNR of the signal falls within a predetermined threshold range;

a ninth instruction for the first signal transmission apparatus to subtract a correction value from the predetermined threshold value;

a tenth instruction for the first signal transmission apparatus to set a system threshold value as the subtracting result;

an eleventh instruction for the first signal transmission apparatus to update the predetermined threshold value into the subtracting result, wherein the subtracting result falls within the predetermined threshold range;

a twelfth instruction for the first signal transmission apparatus to determine a second transmission power of the first signal transmission channel according to the power weight value; and a thirteenth instruction for the first signal transmission apparatus to determine a second transmission mode of the first signal transmission channel according to the system threshold value.

11. The computer program product as claimed in claim 10, wherein the thirteenth instruction further comprises:

a fourteenth instruction for the first signal transmission apparatus to switch the first transmission mode into the second transmission mode according to the system threshold value.

12. A computer program product stored in a computer readable medium for an MIMO antenna system to perform a signal transmission method, the MIMO antenna system having a first signal transmission channel and at least one second signal transmission channel, the computer program product comprising:

a first instruction for a first signal transmission apparatus to transmit a signal with a first transmission mode and a first transmission power via the first signal transmission channel;

a second instruction for a second signal transmission apparatus to receive the signal;

a third instruction for the second signal transmission apparatus to calculate and transmit an interference value of the first signal transmission channel, wherein the interference value is related to a transmission power of the at least one second signal transmission channel;

a fourth instruction for the first signal transmission apparatus to calculate a power weight value according to the interference value;

a fifth instruction for the second signal transmission apparatus to calculate and transmit an SNR of the signal;

a sixth instruction for the first signal transmission apparatus to receive an ACK of the signal from the second signal transmission apparatus;

a seventh instruction for the first signal transmission apparatus to determine that the SNR of the signal is larger than a predetermined threshold value;

an eighth instruction for the first signal transmission apparatus to determine that the SNR of the signal falls within a predetermined threshold range;

a ninth instruction for the first signal transmission apparatus to add a correction value to the predetermined threshold value;

a tenth instruction for the first signal transmission apparatus to set a system threshold value as the adding result;

an eleventh instruction for the first signal transmission apparatus to update the predetermined threshold value into the adding result, wherein the adding result falls within the predetermined threshold range a twelfth instruction for the first signal transmission apparatus to determine a second transmission power of the first signal transmission channel according to the power weight value; and an thirteenth instruction for the first signal transmission apparatus to determine a second transmission mode of the first signal transmission channel according to the system threshold value.

13. The computer program product as claimed in claim 12, wherein the thirteenth instruction further comprises:

a fourteenth instruction for the first signal transmission apparatus to switch the first transmission mode into the second transmission mode according to the system threshold value.

14. A signal transmission method for an MIMO antenna system, the MIMO antenna system having a first signal transmission channel and at least one second signal transmission channel, the signal transmission method comprising the steps of:

enabling at least one transmission unit to transmit a signal with a first transmission mode and a first transmission power via the first signal transmission channel;

enabling the at least one transmission unit to receive an SNR of the signal and an interference value of the first signal transmission channel, wherein the interference value is related to a transmission power of the at least one second signal transmission channel;

enabling a calculation module to calculate a power weight value according to the interference value, enabling the at least one transmission unit to receive an ACK of the signal;

enabling the microprocessor to determine that the SNR of the signal is less than a predetermined threshold value;

enabling the microprocessor to determine that the SNR of the signal falls within a predetermined threshold range;

enabling the calculation module to subtract a correction value from the predetermined threshold value;

enabling the microprocessor to set a system threshold value as the subtracting result;

enabling the microprocessor to update the predetermined threshold value into the subtracting result, wherein the subtracting result falls within the predetermined threshold range; and enabling an adjustment module to determine a second transmission mode of the first signal transmission channel according to the system threshold value, and determine a second transmission power of the first signal transmission channel according to the power weight value.

15. The signal transmission method as claimed in claim 14, wherein the step of determining the second transmission mode of the first signal transmission channel further comprises the step of:

enabling the adjustment module to switch the first transmission mode into the second transmission mode according to the system threshold value.

16. A signal transmission method for an MIMO antenna system, the MIMO antenna system having a first signal transmission channel and at least one second signal transmission channel, the signal transmission method comprising the steps of:

enabling at least one transmission unit to transmit a signal with a first transmission mode and a first transmission power via the first signal transmission channel;

enabling the at least one transmission unit to receive an SNR of the signal and an interference value of the first signal transmission channel, wherein the interference value is related to a transmission power of the at least one second signal transmission channel;

enabling a calculation module to calculate a power weight value according to the interference value;

enabling the at least one transmission unit to receive an ACK of the signal;

enabling the microprocessor to determine that the SNR of the signal is larger than a predetermined threshold value;

enabling the microprocessor to determine that the SNR of the signal falls within a predetermined threshold range;

enabling the calculation module to add a correction value to the predetermined threshold value;

enabling the microprocessor to set a system threshold value as the adding result;

enabling the microprocessor to update the predetermined threshold value into the adding result, wherein the adding result falls within the predetermined threshold range; and enabling an adjustment module to determine a second transmission mode of the first signal transmission channel according to the system threshold value, and determine a second transmission power of the first signal transmission channel according to the power weight value.

17. The signal transmission method as claimed in claim 16, wherein the step of determining the second transmission mode of the first signal transmission channel further comprises the step of:

enabling the adjustment module to switch the first transmission mode into the second transmission mode according to the system threshold value.

18. A signal transmission apparatus for an MIMO antenna system, the MIMO antenna system having a first signal transmission channel and at least one second signal transmission channel, the signal transmission apparatus comprising:

at least one transmission unit being configured to transmit a signal with a first transmission mode and a first transmission power via the first signal transmission channel, and receive an SNR of the signal and an interference value of the first signal transmission channel;

a calculation module being configured to calculate a power weight value according to the interference value of the first transmission channel;

a microprocessor being configured to set a system threshold value of the first signal transmission channel according to the SNR of the signal;

an adjustment module being configured to determine a second transmission mode of the first signal transmission channel according to the system threshold value, and determine a second transmission power of the first signal transmission channel according to the power weight value; and a register being configured to store a predetermined threshold value and a predetermined threshold range;

wherein after the at least one transmission unit receives an ACK of the signal from the second signal transmission apparatus, the microprocessor determines whether the SNR of the signal is less than the predetermined threshold value and determines whether the SNR of the signal falls within the predetermined threshold range, and the interference value is related to a transmission power of the at least one second signal transmission channel.

19. The signal transmission apparatus as claimed in claim 18, wherein when the SNR of the signal is less than the predetermined threshold value and falls within the predetermined threshold range, the calculation module subtracts a correction value from the predetermined threshold value, the microprocessor sets the system threshold value as the subtracting result and updates the predetermined threshold value stored in the register into the subtracting result of, wherein the subtracting result falls within the predetermined threshold range.

20. The signal transmission apparatus as claimed in claim 19, wherein the adjustment module switches the first transmission mode into the second transmission mode according to the system threshold value.

21. The signal transmission apparatus as claimed in claim 18, wherein when the SNR of the signal is not less than the predetermined threshold value and falls within the predetermined threshold range, the calculation module adds a correction value to the predetermined threshold value, the microprocessor sets the system threshold value as the adding result and updates the predetermined threshold value stored in the register into the adding result, wherein the adding result falls within the predetermined threshold range.

22. The signal transmission apparatus as claimed in claim 21, wherein the adjustment module switches the first transmission mode into the second transmission mode according to the system threshold value.

23. A computer program product stored in a computer readable medium for a signal transmission apparatus to perform a signal transmission method, the computer program product comprising:
- a first instruction for at least one transmission unit to transmit a signal with a first transmission mode and a first transmission power via a first signal transmission channel;
- a second instruction for the at least one transmission unit to receive an SNR of the signal and an interference value of the first signal transmission channel, wherein the interference value is related to a transmission power of at least one second signal transmission channel;
- a third instruction for a calculation module to calculate a power weight value according to the interference value;
- a fourth instruction for the at least one transmission unit to receive an ACK of the signal;
- a fifth instruction for the microprocessor to determine that the SNR of the signal is less than a predetermined threshold value;
- a sixth instruction for the microprocessor to determine that the SNR of the signal falls within a predetermined threshold range;
- a seventh instruction for the calculation module to subtract a correction value from the predetermined threshold value;
- an eighth instruction for the microprocessor to set a system threshold value as the subtracting result;
- a ninth instruction for the microprocessor to update the predetermined threshold value into the subtracting result, wherein the subtracting result of falls within the predetermined threshold range; and
- a tenth instruction for an adjustment module to determine a second transmission mode of the first signal transmission channel according to the system threshold value, and determine a second transmission power of the first signal transmission channel according to the power weight value.

24. The computer program product as claimed in claim 23, wherein the tenth instruction further comprises:
- an eleventh instruction for the adjustment module to switch the first transmission mode into the second transmission mode according to the system threshold value.

25. A computer program product stored in a computer readable medium for a signal transmission apparatus to perform a signal transmission method, the computer program product comprising:
- a first instruction for at least one transmission unit to transmit a signal with a first transmission mode and a first transmission power via a first signal transmission channel;
- a second instruction for the at least one transmission unit to receive an SNR of the signal and an interference value of the first signal transmission channel, wherein the interference value is related to a transmission power of at least one second signal transmission channel;
- a third instruction for a calculation module to calculate a power weight value according to the interference value;
- a fourth instruction for the at least one transmission unit to receive an ACK of the signal;
- a fifth instruction for the microprocessor to determine that the SNR of the signal is larger than a predetermined threshold value;
- a sixth instruction for the microprocessor to determine that the SNR of the signal falls within a predetermined threshold range;
- a seventh instruction for the calculation module to add a correction value to the predetermined threshold value;
- an eighth instruction for the microprocessor to set a system threshold value as the adding result;
- a ninth instruction for the microprocessor to update the predetermined threshold value into the adding result, wherein the adding result of falls within the predetermined threshold range; and
- a tenth instruction for an adjustment module to determine a second transmission mode of the first signal transmission channel according to the system threshold value, and determine a second transmission power of the first signal transmission channel according to the power weight value.

26. The computer program product as claimed in claim 25, wherein the tenth instruction further comprises:
- an eleventh instruction for the adjustment module to switch the first transmission mode into the second transmission mode according to the system threshold value.

* * * * *